United States Patent [19]

Ebinger et al.

[11] Patent Number: 5,770,944
[45] Date of Patent: Jun. 23, 1998

[54] METHOD AND PROBE ARRANGEMENT FOR THE ELECTROMAGNETIC DETECTION OF METAL OBJECTS

[75] Inventors: Klaus Ebinger; Augustinus Günnewig, both of Köln, Germany

[73] Assignee: Firma Ing. Klaus Ebinger, Köln, Germany

[21] Appl. No.: 645,792

[22] Filed: May 14, 1996

[30] Foreign Application Priority Data

May 18, 1995 [DE] Germany ................. 195 18 342.8

[51] Int. Cl.⁶ ................. G01R 19/00; G01V 3/08; G01V 3/10
[52] U.S. Cl. ................. 324/329; 324/67; 324/326
[58] Field of Search ................. 324/326, 334, 324/329, 242, 243, 332, 327, 66, 67

[56] References Cited

U.S. PATENT DOCUMENTS 4,818,944  4/1989  Rippingale ................. 324/326

FOREIGN PATENT DOCUMENTS

| | | | |
|---|---|---|---|
| 0279190 | 8/1988 | European Pat. Off. | 324/326 |
| 42 42 541 | 6/1994 | Germany . | |
| 0046480 | 4/1981 | Japan | 324/326 |
| 404116493 | 4/1992 | Japan | 324/326 |

*Primary Examiner*—Sandra L. O'Shea
*Assistant Examiner*—Jay M. Patidar
*Attorney, Agent, or Firm*—Evenson, McKeown, Edwards & Lenahan, PLLC

[57] ABSTRACT

The invention relates to a method and to a probe arrangement for the electromagnetic detection of metal objects. For this purpose several receiving loops are provided, which detect a secondary signal emitted by the sought object. The secondary signals received with the different loops are interconnected and evaluated in object-specific manner. This gives precise information on the position and location of the object to be detected.

19 Claims, 1 Drawing Sheet

5,770,944

METHOD AND PROBE ARRANGEMENT FOR THE ELECTROMAGNETIC DETECTION OF METAL OBJECTS

BACKGROUND OF THE INVENTION

This invention relates to a method and to a probe arrangement for the electromagnetic detection of metal objects. According to the invention, an electromagnetic signal is emitted and excites the object to be detected so that it emits a secondary signal. The secondary signal is received with several loops in the form of several loop-specific secondary signals and is object-specific evaluated and displayed.

DE 42 42 541 Al discloses a method and a probe arrangement of the aforementioned type. Within a support device, four juxtaposed transmitting and receiving coils are moved over an area to be examined so that a larger surface can be scanned. The information from each individual coil is sensed and supplied for processing.

With the known method and probe arrangement there is a parallel scanning with four independent transmitting and receiving coils. The signal evaluation is not of an optimum nature and the position information of the object to be detected could be produced with greater accuracy and over a wider range.

SUMMARY OF THE INVENTION

The object of this invention is to provide a method and a probe arrangement of the aforementioned type leading to a particularly good evaluation of the signal information and to a very precise position detection of the sought object. According to the invention, this object is achieved by emitting an electromagnetic signal and exciting the metal object to emit a secondary signal. The secondary signal is received, with several loops, in the form of several loop-specific secondary signals. The secondary signal undergoes object-specific evaluation and display. The loop-specific secondary signals undergo an interconnection for determining interconnection signals. The interconnection is performed in an object-specific manner and the interconnection signals are supplied for evaluation and display.

A particular probe arrangement is provided for the electromagnetic detection of metal objects. The probe arrangement has several loops which are constructed for the reception of magnetic field signals. The loops are arranged in a matrix-like manner and constructed as receiving loops. A transmitting loop is provided and is arranged around the matrix-like receiving loops.

In accordance with an essential basic concept of the invention, an electromagnetic signal is emitted and excites the object to be detected. The object to be detected, in turn, emits a secondary signal, which can, as a result of the reception, be interconnected and emittedevaluated in planned manner in a number of receiving loops. In the probe arrangement, several receiving loops are arranged in a matrix-like manner and are able in each case to receive the secondary signal emitted by the object to be detected. As a result of the different distances and the spatial arrangement of the different receiving loops with respect to the object, loop-specific secondary signals differing from one another are measured.

These difference measured values are then interconnected or compared. In this way, precise information on the location and position of the object to be detected can be obtained.

It is advantageous to initially store the secondary signals received and then jointly evaluate them. However, it is equally possible to supply each individual secondary signal to the interconnection, where it is intermediately stored. The intermediately stored result is then processed with the next received secondary signal. Preferably, addition and subtraction take place when evaluating the secondary signals. Thus, all the received secondary signals can be summated in order to obtain a stronger location signal than would be possible when processing a single signal.

It is preferable to summate one part of the received secondary signals so as to form a first sum, summate a further part of the received secondary signals to form a second sum, and form a differential signal from said two sums. In this way, it is possible to obtain information on the precise location and position of the object to be detected. Thus, with this method, not only is it possible to prove relative conductivity changes in the ground, but also spatially distributed electrical differences.

Direction information is obtained by a subtraction from a number of secondary signals. With the aid of the direction information, it is also possible to automatically track in said direction the complete probe arrangement.

As a result of the spatial nature, the measurement and the processing of the individual secondary signals received, it is possible to produce computer-assisted shadow images of the search objects. It is preferable to select the secondary signals received and which are to be summated so that a ground or soil compensation is automatically performed. For this purpose two groups of secondary signals must be elected. In the absence of an object to be sought, these groups give in soil-specific manner the same sum. The difference of the two groups consequently gives "zero" for as long as no object modifies the received secondary signal and consequently gives rise to a result differing from "zero". This can take place, for example, by subtraction of two directly juxtaposed receiving loops.

The method is preferably performed in pulse induction (PI) technology. Frequencies between 10 Hz and 10 kHz can be used. However, it is preferable to use bipolar pulses, although it is also possible to adopt a continuous operation.

When using single pulses, it is particularly preferable to initially scan each individual, received signal with a sampling and multiplexing process and process the scanned values. This can take place for the scanned values of each individual, received secondary signal in the same way as described above for all the secondary signals. Thus, a secondary signal, which has already been prepared and processed, is obtained in each receiving channel. Thus, for example, on summating the individual scanned values, secondary signals are obtained. Each of these secondary signals has a sensitivity increased by up to 30% compared with the normal, received secondary signal. With the thus prepared individual values is carried out the further method and the interconnection of the received and prepared secondary signals. This can be performed with mono-single pulses, but preferably is performed with bipolar single pulses.

It is also preferable to perform evaluation with digital methods and microprocessors in order to be able to utilize the multiplicity of available measurement and interconnection possibilities.

For performing the method, the invention provides a probe arrangement with several receiving loops arranged in matrix-like manner and around which is formed a transmitting loop. It is advantageous in this arrangement to use a large transmitting loop passing around the receiving loops and which is able to transmit a wide magnetic field into the ground so that the penetration depth of the magnetic field into the ground is greater. It is also technically advantageous to work with separate transmitting and receiving loops.

Preferably the receiving loops are in the form of a bidimensional matrix, which, in its smallest form, is a 2×2 matrix. As a result of the evaluation of receiving loops arranged in this way, it is possible to find a position and depth with respect to the object more precisely. There is preferably a separate sensing of the receiving coils in the x and y directions. It is possible to detect object concentrations at certain locations of the loop with the search route.

The receiving loops can be further subdivided. Individual receiving loops can be interlocked to form a so-called main loop and, in each case, the individual receiving loops and also the main loop are sensed as a whole. The values of the individual receiving loops and the main loop can be compared with one another and interconnected. In a preferred embodiment, there are four main loops. Each of these main loops comprises four or eight receiving loops. The advantage of this arrangement is that, as a result of the size of the receiving loops, an adaption to the search task is possible. If only large objects are sought, then it is sufficient to merely sense the values of the main loops. However, with smaller search objects, it becomes necessary to sense smaller search loops. The depth range can also be controlled by the choice and use of the receiving loops.

According to a further development of the invention, the large transmitting loop is so constructed that it can both transmit and receive. A received value can be related to the individual received secondary signals and, consequently, an additional interconnection can be brought about, leading to increased precision of the measurement. The diameter of the large transmitting loops can, for example, be between ½ and 5 m. Conversely, there are cases in which it is preferable to construct the small receiving loops and/or main loops as transmitting loops.

In a preferred embodiment of the probe arrangement, each of the receiving loops, each of the main loops and also the transmitting loop used as a receiving loop is connected to a sample and hold device for scanning and storing the received secondary signals. The sample and hold devices have analog switches and capacitors.

According to a further development of the invention, it is also possible to use receiving loops of different sizes. Within a main loop, for example, there can be a very large receiving loop and several smaller receiving loops arranged around the latter. Thus, with the larger receiving loop a higher sensitivity can be obtained. The smaller receiving loops are then used for more precise position location.

Advantageously, the complete probe arrangement is housed in a portable or travelling metal-free apparatus by which it is possible to adjust the loop height with respect to the ground. Adjustability offers the advantage that the influence of highly interfering soils can be reduced by a greater measuring distance. In addition, to a certain extent, small metal parts can be masked out. Such a masking out of undesired parts can also take place through a computer-controlled signal selection. In certain cases it is also possible to use a floatable and/or submersible probe arrangement construction when seeking objects under water. For this purpose, the probe arrangement, with the associated electronics, is placed in a watertight, encapsulated casing. The results are displayed in a display, which can be seen by the user and is controllable from the probe arrangement by radio or cable connection. The floatable and submersible probe arrangement is equipped with floodable tanks, with which the buoyancy or submersion depth can be controlled.

BRIEF DESCRIPTION OF THE DRAWING

The invention is described in greater detail hereinafter in connection with FIG. 1, which is a block circuit diagram illustrating the operation of the probe arrangement.

DETAILED DESCRIPTION OF A PREFERRED EMBODIMENT

Figure 1:
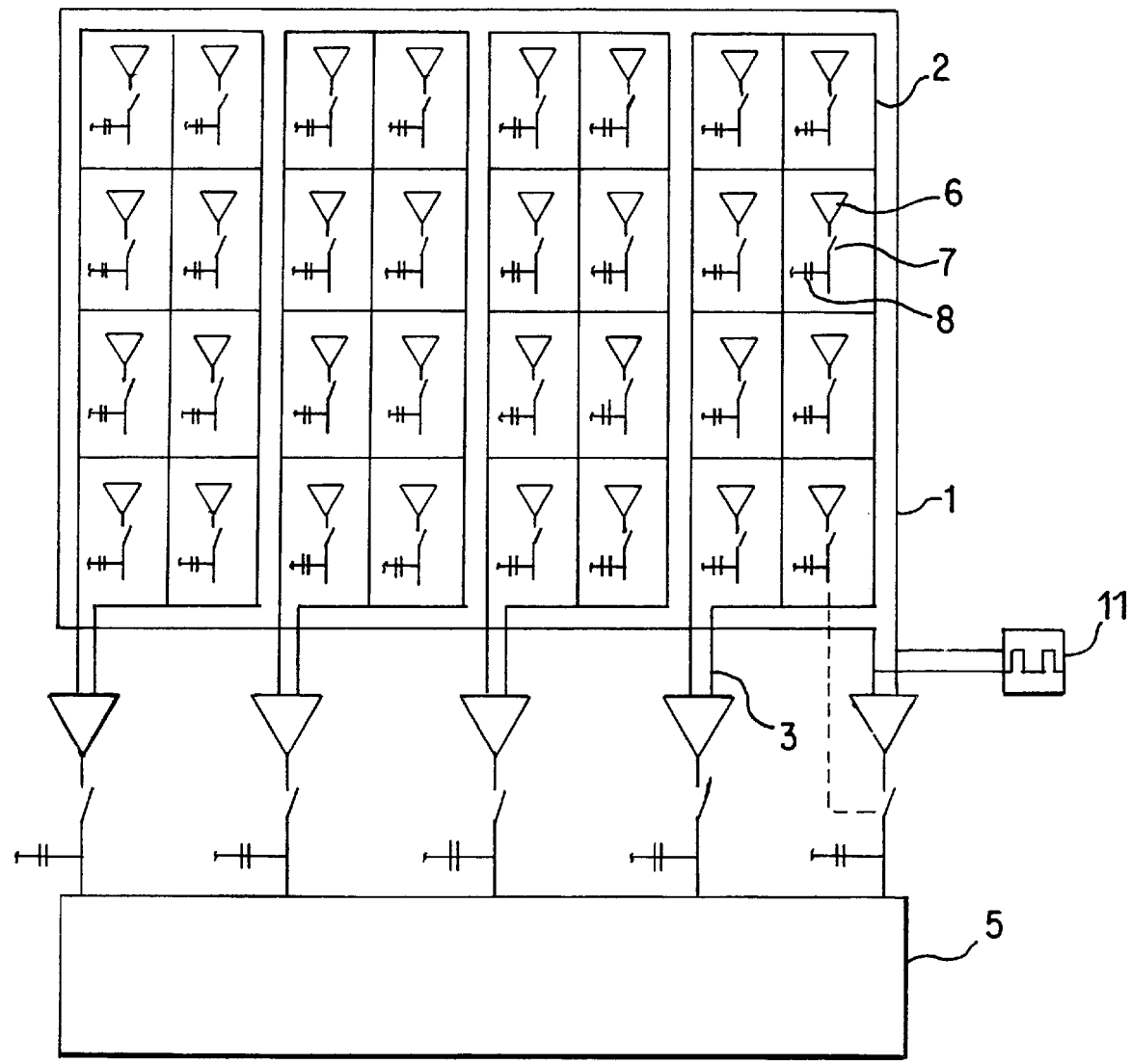

FIG. 1 is a block circuit diagram of a probe arrangement and shows a transmitting loop 1 which is connected to a transmitter 11. The transmitter produces single pulses which can be emitted far into the ground over the large, surrounding transmitting loop 1. The receiving loops 2 are arranged in matrix-like manner within the transmitting loop 1. Each of the receiving loops forms a receiving channel. In each case, eight individual receiving loops 2 are combined to form a main loop 3, which can once again form a receiving channel. The transmitting loop 1 is also constructed as an additional receiving channel and, therefore, there are, in all, 37 receiving channels: 32 for the individual receiving loops 2, four for the main loops 3 and one receiving channel on the transmitting loop 1. The main loops 3 are connected to the multiplexer 5, sensed by means of the 37 receiving channels, i.e. the 37 secondary signals received and supplied to an interconnection of the individual values and further processing. The loops are normally constructed as coils.

The preparation of the individual measured values, which are received by a data logger during the search and are intermediately stored, takes place at a later time by computer-assisted processing. The documented search process can be implemented in random form by suitable software. A direct, analog display during the search is also possible to provide, for example, an indication of the part of the loop in which there are metal objects.

It can be gathered from FIG. 1 that the individual receiving loops 2 and also the main loops 3 in each case have a receiver 6 and a sample and hold device with analog switches 7 and capacitors 8 for time-related and/or amplitude-related scanning and intermediate storage of secondary signals.

We claim:

1. A method for electromagnetic detection of metal objects comprising the steps of:
    emitting an electromagnetic signal so as to excite a metal object and cause the metal object to emit a secondary signal,
    receiving the secondary signal with several receiving loops as several, loop-specific secondary signals,
    interconnecting the loop-specific secondary signals in an object-specific manner for determining interconnection signals, and
    supplying the interconnection signals for evaluation and display.

2. The method according to claim 1, wherein the secondary signals are stored and then jointly evaluated.

3. The method according to claim 1, wherein interconnecting the loop specific secondary signals takes place by adding or subtracting the secondary signals.

4. The method according to claim 1, and further comprising the steps of summating a first part of the secondary signals to a first sum, summating a second part of the secondary signals to a second sum and forming a differential signal from the first and second sums.

5. The method according to claim 4, and further comprising the step of selecting the secondary signals to be summated as a function of a subsoil.

6. The method according to claim 1, wherein said electromagnetic signal is formed of single pulses with a frequency of 10 Hz to 10 kHz.

7. The method according to claim 6, and further comprising the step of producing sampling signals from individual secondary signals at predeterminable sampling times, interconnecting the sampling signals by addition and/or subtraction, and supplying a result for further processing as a prepared secondary signal.

8. The method according to claim 1, wherein said electromagnetic signal is formed of bipolar pulses.

9. The method according to claim 1, wherein the interconnecting step and evaluation of the interconnection signals are performed digitally and in a microprocessor-controlled manner.

10. The method according to claim 1, wherein the step of receiving the secondary signal is performed by a probe arrangement for electromagnetic detection of metal objects which has several receiving loops arranged in matrix-like manner and constructed as receiving loops and a transmitting loop constructed around the receiving loops.

11. The method according to claim 10, wherein the receiving loops are arranged as a bidimensional matrix.

12. The method according to claim 10, wherein several of the receiving loops are combined to form a main loop.

13. The method according to claim 12, and further comprising the step of connecting each main loop to a sample and hold device for scanning and storing scanned signals of the secondary signal.

14. The method according to claim 10, wherein four main loops are provided and each of the four main loops comprises eight receiving loops.

15. The method according to claim 10, wherein the transmitting loop is constructed as a transmitting and receiving loop.

16. The method according to claim 15, and further comprising the step of connecting the transmitting loop to a sample and hold device for scanning and storing scanned signals of the secondary signal.

17. The method according to claim 10, and further comprising the step of connecting each of the receiving loops to a sample and hold device for scanning and storing scanned signals of the secondary signal.

18. The method according to claim 17, wherein the sample and hold device has analog switches and capacitors.

19. The method according to claim 10, and further comprising the step of providing a multiplexer which senses, as a function of a search task, only selected receiving loops.

* * * * *